UNITED STATES PATENT OFFICE.

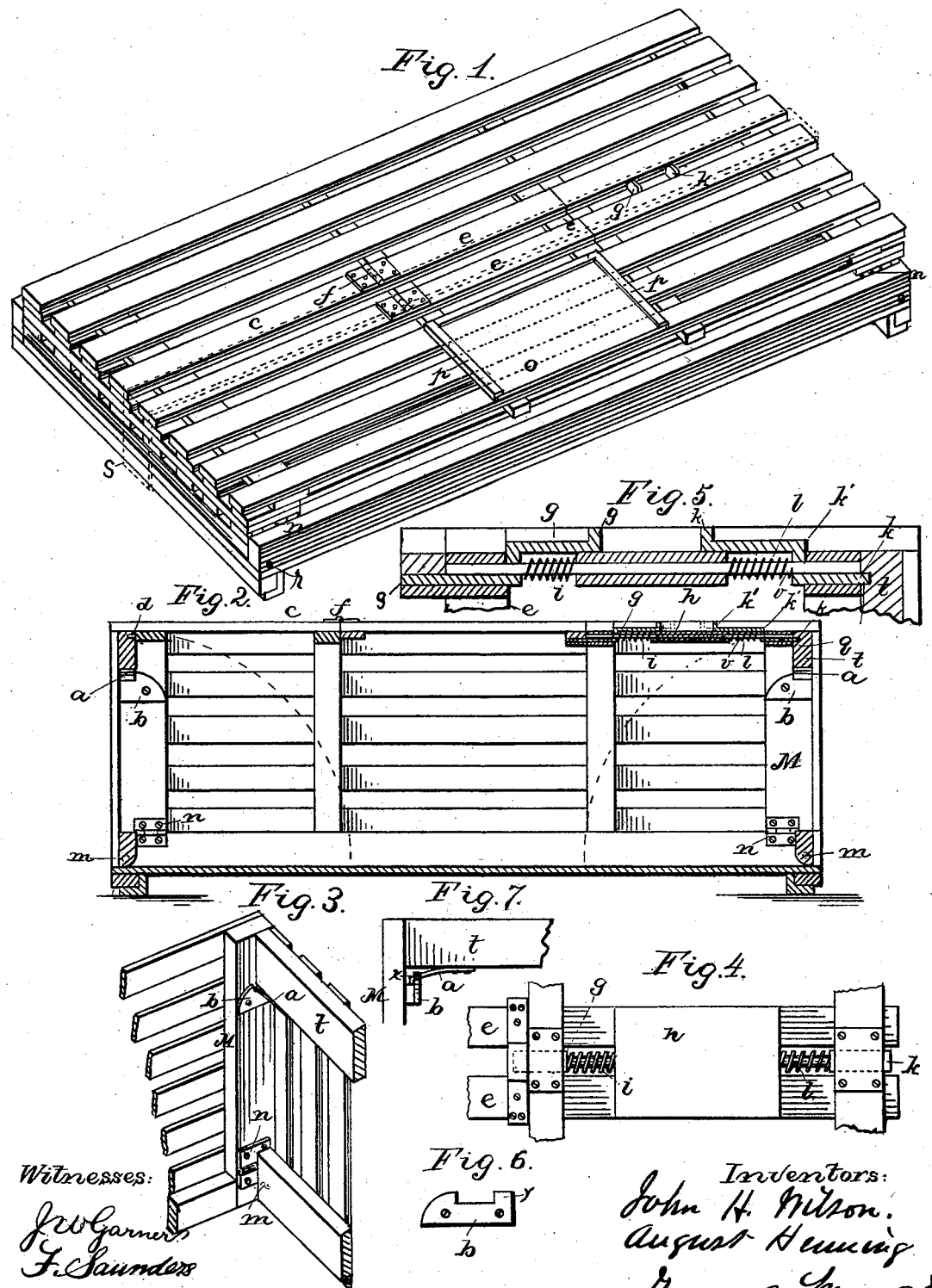

JOHN H. WILSON AND AUGUST HENNING, OF ALEXANDRIA, VIRGINIA.

COMBINATION-CRATE FOR THE TRANSPORTATION OF FRUIT AND LIVE STOCK.

SPECIFICATION forming part of Letters Patent No. 244,409, dated July 19, 1881.

Application filed May 20, 1881. (No model.)

*To all whom it may concern:*

Be it known that we, JOHN H. WILSON and AUGUST HENNING, citizens of the United States of America, residing at Alexandria, in the county of Alexandria and State of Virginia, have invented certain new and useful Improvements in Combination-Crates for Transportation of Fruit and Live Stock; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The nature of our invention consists in the arrangement and construction of a combination-crate for the shipment of fruit or live stock, which can be folded up and made convenient for returning.

In the accompanying drawings, Figure 1 is a perspective of the crate when folded. Fig. 2 is a vertical section lengthwise through the center. Fig. 3 is a perspective of one of the inside corners. Fig. 4 represents the portion of the under side of the cover, showing the manner of fastening the cover to the crate, and also the fastening of a small door in the cover. Figs. 5, 6, and 7 are details of fastenings.

The main body of the crate is constructed in the simplest manner possible. The bottom is of boards fastened to the lowest end pieces. The ends turn down on the bottom by dowel-pins $m$, one end of which is fast in the lower part of the frame of the end, and the other turning in holes $r$ in the solid lower piece of the sides. The sides are hinged to these lower solid pieces by hinges $n$ and turn down over the ends. When folded the cover lies upon the sides, and the whole is strapped together, as shown by the dotted lines $s$ in Fig. 1.

In Fig. 2, $a$ $a$ represent the steel springs, (better shown by $a$, Figs. 3 and 7,) which shut over the catches $b$ $b$ and fasten the ends and sides together. The way in which these parts work is as follows: The catch $b$ is fastened to the frame-piece M at the sides. The spring $a$ is fastened at one end to the under edge of the end frame-piece, $t$. The other end is bent down at right angles, so as to shut over behind the catch $b$. The bent part of the spring $a$ passes in a groove or opening, $x$, Fig. 7, between the catch C and the frame-piece M. In shutting over $b$ the spring is prevented from being pushed behind the catch by the projection $y$ of the back part of the catch. (Shown in Fig. 6.) By this manner of locking the ends of the crate are prevented from falling either way and the sides are locked to the ends, so that there is no need of further fastenings to keep them in position.

When the cover is ready to be put on, the dowel-pins in one end, one of which is shown at $d$, enter the frame-piece of that end of the crate. The other end of the cover then drops down upon the edges of the crate, and is fastened by a flat bolt, $k$, which enters the top frame-piece, $t$, at $q$. One end of this bolt is bent up so as to project through the slats and be worked from the outside at $k$. This bolt is pushed into place by the spiral spring $l$, which works on an iron rod or traveler, $v$, fastened into and passing across from the end frame-piece of the cover to the block-piece $h$, used for holding that end of the traveler.

A trap-door, $e$, in the center of the cover turns over on the part $c$ by the hinges $f$. $g, h$, and $i$ show a spring-bolt for fastening the trap-door, of the same kind as the one which fastens the cover to the crate.

Fig. 4 represents the part of the under side of the cover to which the springs and their attachments are fastened. $h$ shows the solid block which holds the ends of the travelers inside of the springs $i$ and $l$. These springs, in opening, push the bolts $g$ and $k$ into their respective apertures, one, $g$, fastening one end of the doors and the other, $k$, the end of the cover.

On the cover is attached a card-holder, so made that a card with a name and address may be inserted.

Having thus fully described our invention, what we claim as new, and desire to secure by Letters Patent, is—

The steel springs $a$ $a$ and the catches $b$ $b$, in combination with the sides and ends of a folding crate, whereby, when shut together, the sides and ends are locked and held together without other fastening, substantially as shown.

In testimony whereof we affix our signatures in presence of two witnesses.

JOHN H. WILSON.
AUGUST HENNING.

Witnesses:
WILLIAM P. BUCKLEY,
GEORGE F. STERNER.